United States Patent [19]
Kim

[11] Patent Number: 5,892,593
[45] Date of Patent: Apr. 6, 1999

[54] APPARATUS AND METHOD FOR PROCESSING A NONSTANDARD SYNC SIGNAL IN A VIDEO SIGNAL PROCESSING SYSTEM

[75] Inventor: Yong-Je Kim, Suwon, Rep. of Korea

[73] Assignee: Samsung Electronics Co., Ltd., Kyungki-Do, Japan

[21] Appl. No.: 772,124

[22] Filed: Dec. 20, 1996

[30] Foreign Application Priority Data

Dec. 27, 1995 [KR] Rep. of Korea ............... 1995-59466

[51] Int. Cl.⁶ ........................................ H04N 5/95
[52] U.S. Cl. .................. 358/497; 386/90; 386/47; 386/124
[58] Field of Search ................. 348/497, 498, 348/537, 538, 539, 604; 386/2, 3, 13, 20, 21, 33, 34, 40, 47, 49, 50, 85, 90, 91, 109, 112, 116, 124; H04N 5/95, 9/89

[56] References Cited

U.S. PATENT DOCUMENTS 4,729,025  3/1988  Yanase ........................... 348/497

*Primary Examiner*—David E. Harvey
*Attorney, Agent, or Firm*—Sughrue, Mion, Zinn, Macpeak & Seas, PLLC

[57] ABSTRACT

There is disclosed a nonstandard sync signal processing apparatus for a video signal processing system, including: a signal separator separating a composite sync signal of a video signal into horizontal and vertical sync signals; a horizontal period counter counting a clock signal for a given horizontal period and producing a processed horizontal sync signal; a vertical period counter counting a clock signal for a given vertical period and producing a processed vertical sync signal; an error detector detecting if an error occurs in the separated horizontal sync signal by comparing it with the processed horizontal sync signal, and detecting if an error occurs in the separated vertical sync signal by comparing it with the processed vertical sync signal; a first data converter converting the video signal of a period prior to where the erroneous horizontal sync signal occurs into corresponding digital data if the error detector determines that the horizontal sync signal is erroneous; and a second data converter converting the video signal of a horizontal period prior to where the erroneous vertical sync signal occurs, into corresponding digital data if the error detector determines that the vertical sync signal is erroneous.

15 Claims, 3 Drawing Sheets

APPARATUS AND METHOD FOR PROCESSING A NONSTANDARD SYNC SIGNAL IN A VIDEO SIGNAL PROCESSING SYSTEM

BACKGROUND OF THE INVENTION

1. Field of the Invention

The present invention relates to a video signal processing system that records and plays back a video signal in response to a sync signal, and more particularly, to an apparatus and a method for processing a video signal and which allows a video to be normally displayed on a screen even if a nonstandard sync signal is received by the processing system.

The present application for an apparatus and method for processing a nonstandard sync signal in a video signal processing system is based on Korean Application No. 59466/1995 which is incorporated herein by reference for all purposes.

2. Description of the Related Art

In a video signal processing system such as a digital video cassette recorder (DVCR), a digital camcorder and the like, a supplied video signal can be recorded on a recording medium, such as a magnetic tape, in response to a sync signal attained from the video signal. The recorded video signal can subsequently be played back through the use of the recorded sync signal. If there is an error in the sync signal of the supplied input video signal in a conventional video signal processing system, particularly in a digital video cassette recorder, errors also occur in a pilot frame signal used for recording and a track pair number used during playback. Such errors act as a principal cause of distortion and damage to the video signal displayed on the screen at the time of playback.

The erroneous sync signal also adversely affects the sequence of addresses for reading/writing out a video signal. More specifically, in a memory of the video signal processing system, the erroneous sync signal induces the reading of incorrect data from the memory and/or the writing of data into wrong locations of the memory. This also damages the video signal to be displayed.

SUMMARY OF THE INVENTION

Accordingly, it is an object of the present invention to provide an apparatus and a method for signal processing which allows a video signal to be normally reproduced on a screen even if a nonstandard sync signal is generated in a supplied video signal.

It is another object of the present invention to provide an apparatus and a method for video processing which allows a video signal to be normally recorded on magnetic medium even if a nonstandard sync signal is generated.

To achieve these and other advantages of the present invention, as broadly described herein, the present invention discloses a nonstandard sync signal processing apparatus for a video signal processing system including: a sync separator separating a composite sync signal of a supplied video signal into separated horizontal and vertical sync signals; a horizontal period counter counting a clock signal for a predetermined period for a horizontal signal and generating a first processed horizontal sync signal; and a first comparator comparing the first processed horizontal sync signal with the separated horizontal sync signal of the input video signal, generating a second processed horizontal sync signal from the first processed horizontal sync signal if the separated horizontal sync signal and the first processed horizontal sync signal coincide with each other, and generating a first error signal if the separated horizontal sync signal and the first processed horizontal sync signal do not coincide with each other.

The inventive apparatus also includes a vertical period counter counting the clock signal for a predetermined period for a vertical signal in response to the second processed horizontal sync signal and generating a first processed vertical sync signal; a second comparator comparing the first processed vertical sync signal with the separated vertical sync signal of the input video signal, generating a second processed vertical sync signal from the first processed vertical sync signal if the separated vertical sync signal and the first processed horizontal sync signal coincide with each other, and generating a second error signal if the separated vertical sync signal and the first processed vertical sync signal do not coincide with each other; a data converter, responsive to said first and second comparing means, for 1) converting luminance and color difference signals of the input video signal into digital video data synchronized to the second processed horizontal and the second processed vertical sync signals or 2) providing digital video data of a previous frame of video data based on the presence of at least one of said first and second error signals.

The inventive apparatus further includes a signal generator producing a frame pulse and a repeat recording instruction signal to repeat recording in response to generation of at least one of the first and second error signals; an ID generator producing a pilot frame in response to the frame pulse; a memory storing digital video data; an address generator producing a write address and a write enable signal indicating a location in the memory into which the digital video data generated by the data converter is written by the use of the second processed horizontal and vertical sync signals, and generating a read address and a read enable signal indicating a location in the memory which the data written into the memory is read out of; a compressor compressing the video data produced from the memory; and error correction coder/modulator performing error correction coding and modulating operations on the compressed video data in response to the pilot frame and the repeat recording instruction signal.

Another aspect of the present invention includes a method of processing a nonstandard sync signal in a system for transmitting a supplied video signal to a recording medium. The method includes the steps of: separating a composite sync signal of the video signal into separated horizontal and vertical sync signals; respectively comparing processed horizontal and vertical sync signals produced by counting a clock signal for predetermined horizontal and vertical periods with the separated horizontal and vertical sync signals, and determining whether the processed horizontal and vertical sync signals respectively coincide with the separated horizontal and vertical sync signals to determine the presence or absence of at least one of an erroneous horizontal sync signal and an erroneous vertical sync signal; converting the video signal of a period prior to where the erroneous horizontal sync signal is generated into corresponding digital data and transmitting the digital data to the medium if the separated horizontal sync signal and the processed horizontal sync signal do not coincide; and converting the video signal of a horizontal period prior to where the erroneous vertical sync signal is generated into corresponding digital data and transmitting the digital data to the medium if the separated vertical sync signal and the processed vertical sync signal do not coincide.

BRIEF DESCRIPTION OF THE DRAWINGS

A more complete appreciation of the present invention and the attendant advantages thereof will be readily apparent with reference to the following detailed description of a preferred embodiment when considered in conjunction with the accompanying drawings, in which like reference symbols indicate the same or similar components, wherein: FIG.

DETAILED DESCRIPTION OF THE PREFERRED EMBODIMENT

A preferred embodiment of the present invention will be described in detail with reference to the accompanying drawings.

Figure 1:
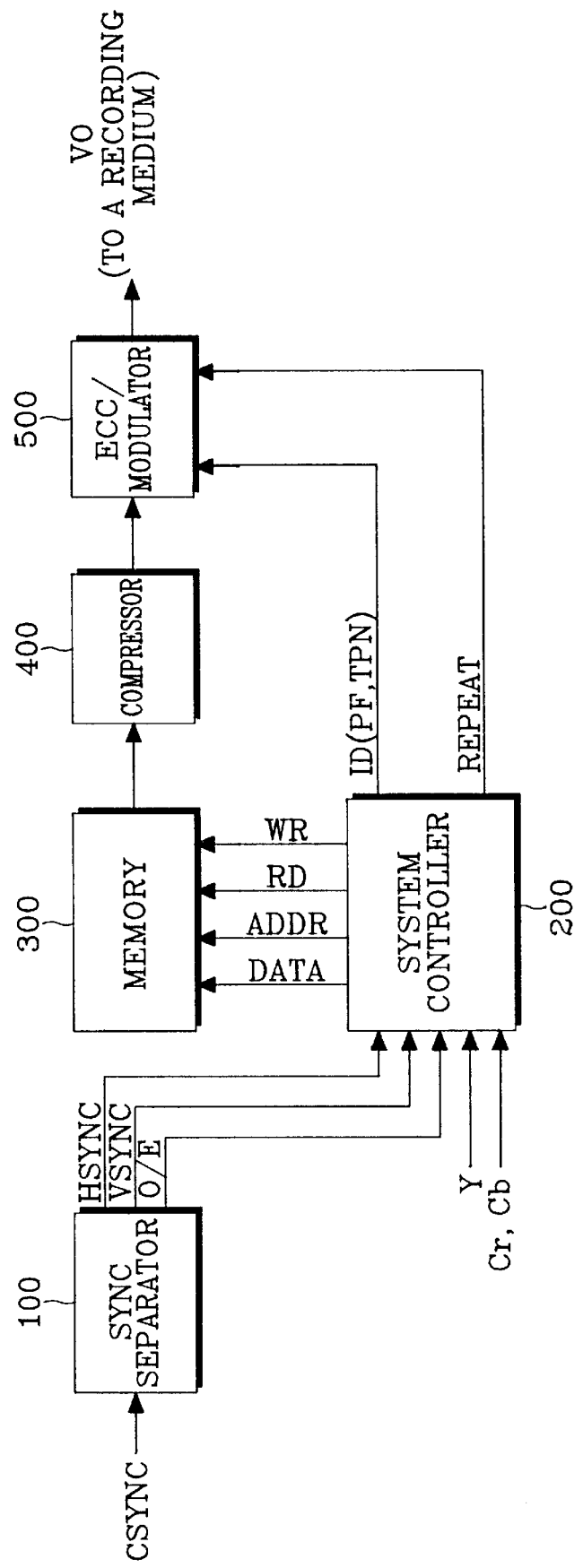
FIG. 1 is a block diagram illustrating a nonstandard sync signal processing apparatus in accordance with the present invention.

FIG. 1 is a block diagram of a nonstandard sync signal processing apparatus in accordance with the present invention. The construction of a nonstandard sync signal processing apparatus employed in a digital video cassette recorder (DVCR) is shown as an example. However, the present invention may be used with other types of digital video signal processing systems.

Once a composite sync signal CSYNC is applied to a sync separator 100, the sync separator 100 separates the composite sync signal CSYNC into a horizontal sync signal HSYNC, a vertical sync signal VSYNC, and a field indicating signal O/E which is indicative of an odd field or an even field. These signals are applied to a system controller 200. The system controller 200 determines whether the separated sync signals are in a normal state. In other words, the controller determines if there is an error in each of the sync signals. Even if an error is detected in the separated sync signals, the system controller 200 allows a pilot frame signal PF, ID which is required for recording and a track pair number TPN, ID which is required for playback to be normally produced.

When the horizontal sync signal HSYNC is in an abnormal state, the system controller 200 holds the data of a period prior to where the erroneous sync signal occurs and allows previous the data to be written into a memory 300. In case there is an error in the vertical sync signal VSYNC or the field indicating signal O/E, the system controller 200 allows either data of a field prior to where the erroneous sync signal is produced or blue or gray data to be written into the memory 300. To process the data in the above manner when erroneous sync signals are produced, the system controller 200 generates a proper address signal ADDR, a read enable signal RD and a write enable signal WR in response to the erroneous sync signals to read and write video data to the memory so that a video signal may be reproduced for display.

Data DATA is written into the memory 300 in response to the address ADDR and write enable signal WR produced by the system controller 200. The data stored in the memory 300 is provided to a compressor 400 by the address ADDR and read enable signal RD. The data DATA generated by the system controller 200 corresponds to digital luminance data and color difference data converted into digital signals by the system controller 200 from the analog luminance signal Y and color difference signals Cr and Cb of the applied video signal.

The compressor 400 processes the data output by the memory 300. The processing includes discrete cosine transformation, quantization and variable length coding to output data with reduced binary digits from the input DATA signal. When the data compressed by the compressor 400 is input to an error correction coder/modulator 500, the error correction coder/modulator 500 adds a predetermined parity to the data and modulates the data to produce a video output VO. The video output VO is recorded on a recording medium. IDs PF and TPN and repeat recording instruction signal REPEAT are now discussed with reference to FIG. 2.

Figure 2:
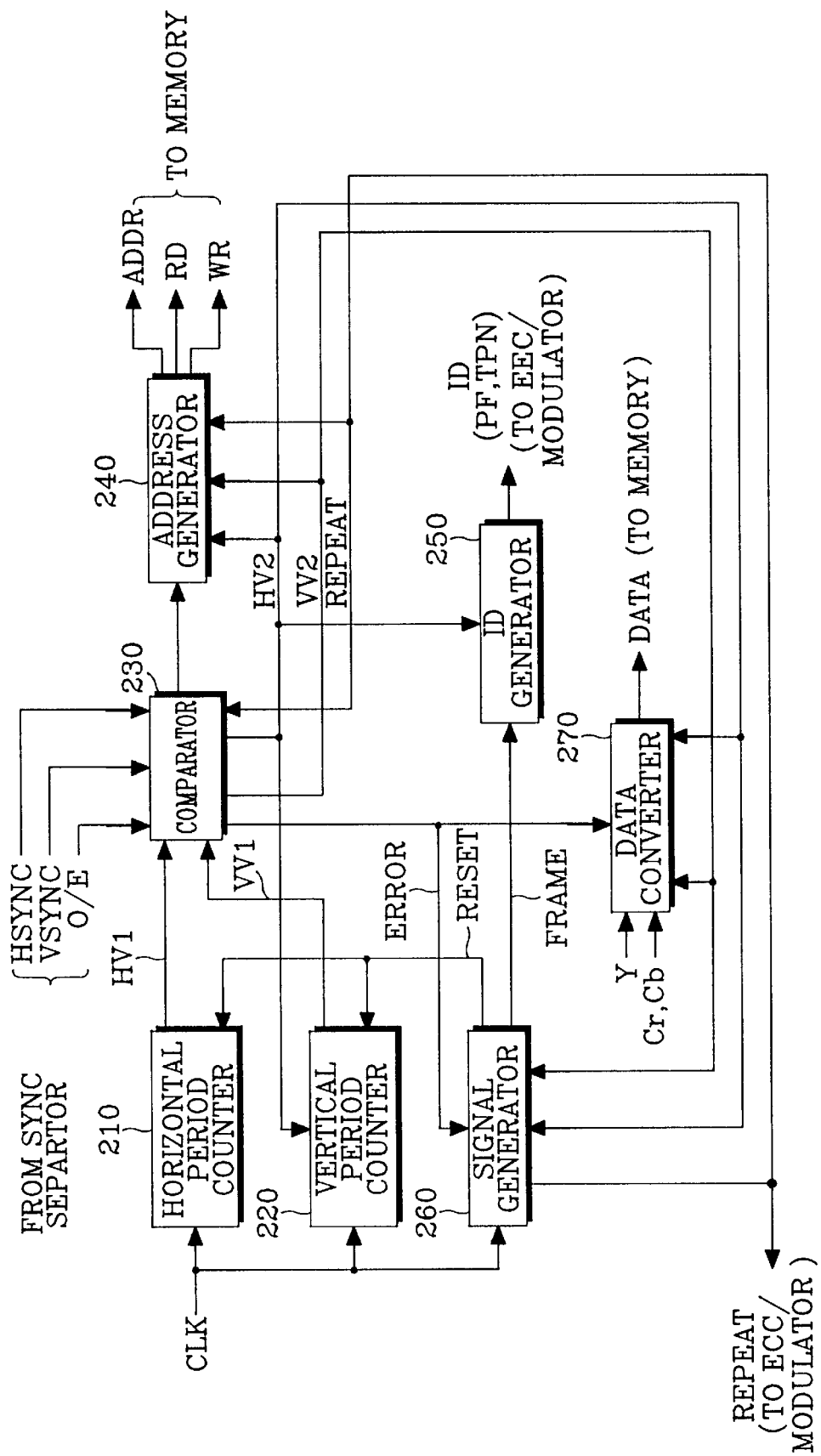
FIG. 2 shows the detailed construction of a system controller of FIG. 1.

FIG. 2 illustrates the detailed construction of the system controller 200 of FIG. 1. The system controller 200 includes a horizontal period counter 210, a vertical period counter 220, a comparator 230, an address generator 240, an ID generator 250, a signal generator 260, and a data converter 270.

Referring to FIG. 2, when the horizontal sync signal HSYNC, vertical sync signal VSYNC and field indicating signal O/E are input to the system controller 200 from the sync separator 100, the horizontal and vertical period counters 210 and 220 are initialized, and the horizontal period counter 210 counts a clock signal CLK for a predetermined period for a horizontal signal. For example, when the frequency of the clock signal CLK is 13.5 MHz, according to the NTSC system, the horizontal period counter 210 generates a first horizontal value HV1 that is a pulse form of a logic "low" level every 858 clock pulses. The first horizontal value HV1 maintains either a logic "high" or "low" level for active periods (720 clocks) regulated in accordance with CCIR601. Outside the active period, the first horizontal value HV1 maintains the opposite logic level as that provided in the active period. The first horizontal value HV1 is applied to the comparator 230 and is compared with the separated horizontal sync signal HSYNC supplied from the sync separator 100. If the first horizontal value HV1 coincides with the horizontal sync signal HSYNC, the comparator 230 outputs a second horizontal value HV2 to the vertical period counter 220 that is the pulse form of the logic "low" level for one clock pulse at every 858 clock pulses.

The vertical period counter 220 increases a vertical period counter value in response-to the clock CLK whenever the second horizontal value HV2 is received from the comparator. If the increase of the vertical period counter value upon response to CLK and HV2 corresponds to the period for a vertical signal, the vertical period counter 220 produces a first vertical value VV1 to the comparator 230. The period for the vertical signal is substantially equivalent to 262.5 times (525 lines/2) one period (1H) of the second horizontal sync signal. For example, the first vertical value VV1 maintains the logic "high" or "low" level for active periods (240 H). Outside the active period, VV1 maintains the opposite logic level as that provided in the active period.

The comparator 230 determines if the first vertical value VV1 from the vertical period counter 220 corresponds to the separated vertical sync signal VSYNC from the sync separator 100. If it turns out that the first vertical value VV1 coincides with the vertical sync signal VSYNC, the comparator 230-produces a second vertical value VV2 to the signal generator 260 corresponding to the vertical period. The signal generator 260 receives the output second vertical value VV2 and produces a frame signal FRAME and supplies the signal to ID generator 250. The signal generator 260 also produces a reset signal RESET to the horizontal and vertical period counters 210 and 220 for initialization.

Meanwhile, the comparator 230 which detects whether an error occurs within horizontal and vertical sync signals HSYNC and VSYNC also detects the field indicating signal O/E and determines whether an error occurs in a certain field. The comparator 230 outputs an error signal ERROR to the signal generator 260 and the data converter 270 when an HSYNC or VSYNC error occurs. The signal generator 260 counts the error signal ERROR, and if the first error signal ERROR is counted, the signal generator 260 produces the frame signal FRAME for the period where the horizontal sync signal HSYNC or vertical sync signal VSYNC should actually be produced. The frame signal FRAME substitutes for the sync signal during the period when an error is detected in HSYNC or VSYNC.

The ID generator 250 generates the pilot frame PF and track pair number TPN in response to the frame signal FRAME. Because the pilot frame PF which is necessary for signal recordation is produced even when an erroneous sync signal exists, the video signal can be normally recorded on a recording medium despite this error. Similarly, a recorded video signal can be played back upon activation the track pair number signal TPN which is generated in response to the FRAME signal so that the video signal can be used to reproduce a display despite the sync error.

The data converter 270 detects if there is an erroneous horizontal or vertical sync signal HSYNC or VSYNC based on the presence or absence of the ERROR signal. In case an error occurs in the horizontal sync signal HSYNC, the data converter 270 holds a data pixel value of a period prior to where the erroneous horizontal sync signal HSYNC occurs, and controls the prior pixel to be produced as the data DATA to be read to/from the memory. In case there is an error in the vertical sync signal VSYNC or field indicating signal O/E, the data converter 270 holds a pixel value of a period prior to where the erroneous vertical sync signal VSYNC or erroneous field indicating signal O/E is produced, and controls the prior pixel to be produced as the data DATA. Alternatively, the data converter 270 may allow a value of blue or gray data to be produced as the data DATA, rather than providing data of the erroneous vertical period.

In addition to the above, if there is a nonstandard sync signal, the data converter 270 not only writes into the memory 300 the data DATA of a field prior to where the erroneous sync signal is generated, but also discards the data DATA after the field where the erroneous sync signal is produced. For example, if the erroneous sync signal is produced at a first field, the data converter 270 discards the data of the second field. If the erroneous sync signal is produced at the second field, the data converter 270 controls the data of the preceding field to be written into the memory.

When the data of the next field is input after a sync signal error, the data converter 270 initializes the system controller 200 and controls it to repeat the operation such that data of the preceding frame is repeatedly written into a frame memory of the ECC/modulator 500. The signal for this operation is a repeat recording instructions signal REPEAT produced by the signal generator 260. Once the repeat recording instructions signal REPEAT is produced by the signal generator 260, the output of data stored in the memory 300 is discarded, and data of the preceding frame stored in the frame memory of the ECC/modulator 500 is output.

Accordingly, the data of the entire frame where the error occurs is replaced with the data of a different frame so that a normal picture can be played back.

The ID generator 250 outputs the track pair number TPN per track (48H), and produces a pilot frame PF per frame. When there is an error in the sync signal, the data of the preceding frame stored in the frame memory of the ECC/modulator 500 is used as the track pair number TPN, and data produced after the data of the preceding frame is toggled is used as the pilot frame PF. In addition, when there is an error in the sync signal, the address generator 240 is initialized to a pulse of the next frame in response to the repeat recording instructions signal REPEAT, and is then normally actuated.

Figure 3A:
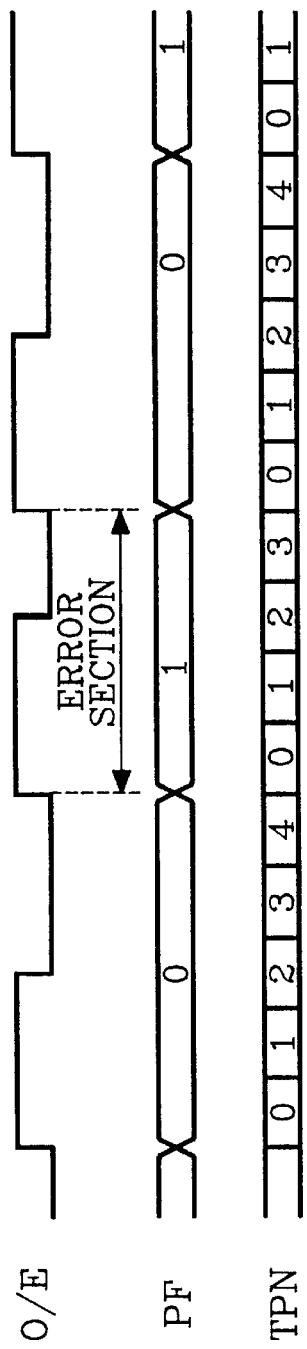
FIGS. 3A and 3B are views for explaining the operation of the present invention compared to the operation of a conventional system.
Figure 3B:
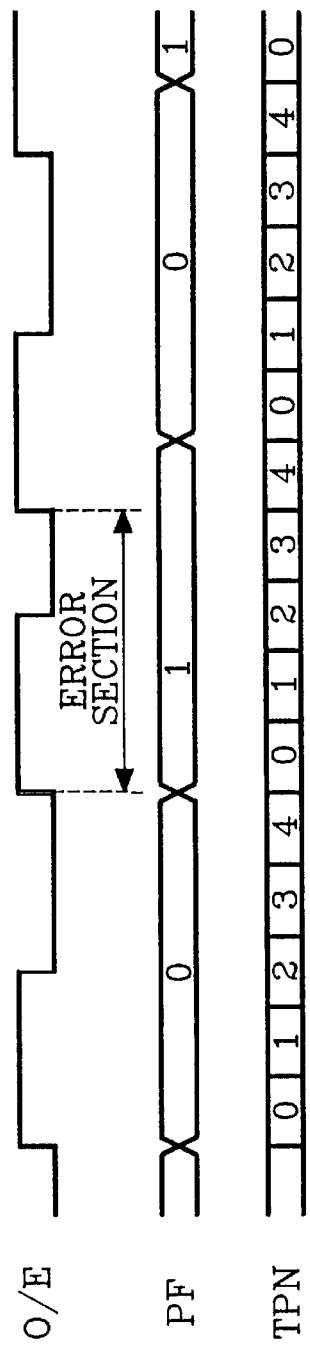

FIGS. 3A and 3B respectively depict the operations of respective signals according to the conventional art and the present invention.

FIG. 3A illustrates IDs such as the pilot frame PF and track pair number TPN produced when an error occurs in the vertical sync signal VSYNC. According to the conventional art, when there is an error in the vertical sync signal VSYNC, the pilot frame PF indicates "1" in the period where the erroneous sync signal occurs, and the track pair numbers TPN produced for this period are 0, 1, 2 and 3, as shown in FIG. 3A. According to the present invention, however, the pilot frame PF indicates "1" after the erroneous field, and the track pair numbers TPN 0, 1, 2, 3 and 4 corresponding to the pilot frame PF are generated.

In accordance with the present invention, the data of the preceding frame is recorded on recording medium or a predetermined value of data is recorded on the medium while there is an error in the sync signal so that the video signal recorded on the recording medium can be played back in normal condition.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A nonstandard sync signal processing apparatus for a video signal processing system, comprising:

sync separating means separating a composite sync signal of an input video signal into separated horizontal and vertical sync signals;

horizontal period counting means counting a clock signal for a predetermined period for a horizontal signal and generating a first processed horizontal sync signal;

first comparing means comparing the first processed horizontal sync signal with the separated horizontal sync signal of the input video signal, generating a second processed horizontal sync signal from the first processed horizontal sync signal if the separated horizontal sync signal and the first processed horizontal sync signal coincide with each other, and generating a first error signal if the separated horizontal sync signal and the first processed horizontal sync signal do not coincide with each other;

vertical period counting means counting the clock signal for a predetermined period for a vertical signal in response to the second processed horizontal sync signal and generating a first processed vertical sync signal;

second comparing means comparing the first processed vertical sync signal with the separated vertical sync signal of the input video signal, generating a second processed vertical sync signal from the first processed vertical sync signal if the separated vertical sync signal and the first processed vertical sync signal coincide with each other, and generating a second error signal if the separated vertical sync signal and the first processed vertical sync signal do not coincide with each other;

data converting means, responsive to said first and second comparing means, for 1) converting luminance and color difference signals of the input video signal into digital video data synchronized to the second processed horizontal and second processed vertical sync signals or 2) providing digital video data of a previous frame based on the presence of one of said first and second error signals;

signal generating means producing a frame pulse and a repeat recording instruction signal to repeat recording in response to generation of at least one of the first or second error signals;

ID generating means producing a pilot frame in response to the frame pulse;

a memory storing digital video data;

address generating means producing a write address and a write enable signal indicating a location in the memory into which the digital video data generated from the data converting-means is written by the use of the second processed horizontal and vertical sync signals, and generating a read address and a read enable signal indicating a location in the memory which the data written into the memory is read out of;

compressing means compressing the video data produced from the memory; and error correction coding/modulating means performing error correction coding and modulating operations on the compressed video data in response to the pilot frame and the repeat recording instruction signal.

2. A method of processing a nonstandard sync signal in a system for transmitting an input video signal to a recording medium, comprising the steps of:

separating a composite sync signal of the video signal into separated horizontal and vertical sync signals;

respectively comparing processed horizontal and vertical sync signals produced by counting a clock signal for predetermined horizontal and vertical periods with the separated horizontal and vertical sync signals, and determining whether first processed horizontal and vertical sync signals respectively coincide with the separated horizontal and vertical sync signals to determine the presence or absence of at least one of an erroneous horizontal sync signal and an erroneous vertical sync signal;

converting the video signal of a period prior to where the erroneous horizontal sync signal is generated into corresponding digital data and transmitting the digital data to the medium if the separated horizontal sync signal and the processed horizontal sync signal do not coincide; and converting the video signal of a horizontal period prior to where the erroneous vertical sync signal is generated into corresponding digital data and transmitting the digital data to the medium if the separated vertical sync signal and the processed vertical sync signal do not coincide.

3. A method for processing a nonstandard sync signal in a system for transmitting an input video signal to a recording medium, comprising the steps of:

separating a composite sync signal of the video signal into separated horizontal and vertical sync signals;

respectively comparing first processed horizontal and vertical sync signals produced by counting a clock signal for predetermined horizontal and vertical periods with the separated horizontal and vertical sync signals, and determining whether the processed horizontal and vertical sync signals respectively coincide with the separated horizontal and vertical sync signals to determine the presence or absence of at least one of an erroneous horizontal sync signal and an erroneous vertical sync signal;

converting the video signal of a period prior to where the erroneous horizontal sync signal is generated into corresponding digital data and transmitting the digital data to the medium when the erroneous horizontal sync signal is detected; and converting predetermined digital video data instead of the video signal of the period where the erroneous vertical sync signal is generated into corresponding digital data and transmitting the digital data to the medium when the erroneous vertical sync signal is detected.

4. A nonstandard sync signal processing apparatus for a video signal processing system, comprising:

signal separating means separating a composite sync signal of a predetermined video signal into horizontal and vertical sync signals;

horizontal period counting means counting a clock signal for a predetermined horizontal period and generating a horizontal value;

vertical period counting means counting the clock signal for a predetermined vertical period and generating a vertical value;

error detecting means detecting whether an error occurs in the horizontal sync signal by comparing the horizontal value with the horizontal sync signal, and detecting if an error occurs in the vertical sync signal by comparing the vertical value with the vertical sync signal to determine the presence or absence of at least one of an erroneous horizontal sync signal and an erroneous vertical sync signal;

first data converting means converting the video signal of a period prior to where the erroneous horizontal sync signal is generated into corresponding digital data if the error detecting means determines that the erroneous horizontal sync signal is present; and second data converting means converting the video signal of a horizontal period prior to where the erroneous vertical sync signal is generated into corresponding digital data if the error detecting means determines that the erroneous vertical sync signal is present.

5. A nonstandard sync signal processing apparatus for a video signal processing system, comprising:

signal separating means separating a composite sync signal of a predetermined video signal into horizontal and vertical sync signals;

horizontal period counting means counting a clock signal for a predetermined horizontal period and generating a horizontal value;

vertical period counting means counting the clock signal for a predetermined vertical period and generating a vertical value;

error detecting means detecting if an error occurs in the horizontal sync signal by comparing the horizontal value with the horizontal sync signal, and detecting if an error occurs in the vertical sync signal by comparing the vertical value with the vertical sync signal;

first data output means converting the video signal of a period prior to where an erroneous horizontal sync signal is generated into corresponding digital data and outputting the digital data if the error detecting means determines that the erroneous horizontal sync signal is present; and second data output means producing predetermined digital video data, instead of the video signal of a period where an erroneous vertical sync signal is generated, if the error detecting means determines that the erroneous vertical sync signal is present.

6. An apparatus according to claim 5, wherein said second data output means produces blue video data instead of the video signal of the period where the error occurs.

7. An apparatus according to claim 5, wherein said second data output means produces gray video data instead of the video signal of the period where the error occurs.

8. A nonstandard sync signal processing apparatus for a video signal processing system, comprising:

sync separating means separating a composite sync signal of an input video signal into separated horizontal and vertical sync signals;

horizontal period counting means counting a clock signal for a predetermined period for a horizontal signal and generating a first processed horizontal sync signal;

a comparator, receiving said separated horizontal and vertical sync signals and said first processed horizontal sync signal, to generate an error signal if said separated horizontal sync signal and said first processed horizontal sync signal do not coincide and to generate a second processed horizontal sync signal if said separated horizontal sync signal and said first processed horizontal sync signal do coincide;

a vertical period counting means counting the clock signal for a predetermined period for a vertical signal in response to said second processed horizontal sync signal to produce a first processed vertical sync signal to said comparator, wherein said comparator compares said separated vertical sync signals and said first processed vertical sync signal to generate said error signal if said separated vertical sync signal and said first processed vertical sync signal do not coincide and to generate a second processed vertical sync signal if said separated horizontal sync signal and said first processed vertical sync signal do coincide; and a data controller, responsive to said comparator, to convert said input video signal into digital video data in accordance with said second processed horizontal and vertical sync signals or to provide a predetermined digital video data information, based on the presence or absence of said error signal, to record a video display.

9. An apparatus according to claim 8 wherein said predetermined digital video data of said data controller comprises video data information of a previous frame of the input video signal.

10. An apparatus according to claim 8 wherein said predetermined digital video data of said data controller comprises video data of one of a blue video signal and a gray video signal.

11. An apparatus according to claim 8 further comprising:

a signal generator, responsive to said comparator, to output a predetermined frame signal when said error signal is output by said comparator;

an identifier generator; and an error correction circuit, wherein said identifier generator outputs at least one of a pilot frame and a track number pair of a previous frame of the input video signal to said error correction circuit when said identifier generator receives said predetermined frame signal, and wherein said signal generator further outputs a repeat command to said error correction circuit to output video data of the previous frame of the input video signal to record the input video signal when said error signal is output by said comparator.

12. An apparatus according to claim 11 wherein said predetermined digital video data of said data controller comprises video data information of a previous frame of the input video signal.

13. An apparatus according to claim 11 wherein said predetermined digital video data of said data controller comprises video data of one of a blue video signal and a gray video signal.

14. A method according to claim 3 wherein the predetermined digital video data comprises video data of one of a blue video signal and a gray video signal.

15. A method according to claim 3, wherein the predetermined digital video data comprises video data information of a previous frame of the input video signal.

* * * * *